April 12, 1960  H. W. WRIGHT  2,932,103
SHOVEL CART
Filed Nov. 21, 1956
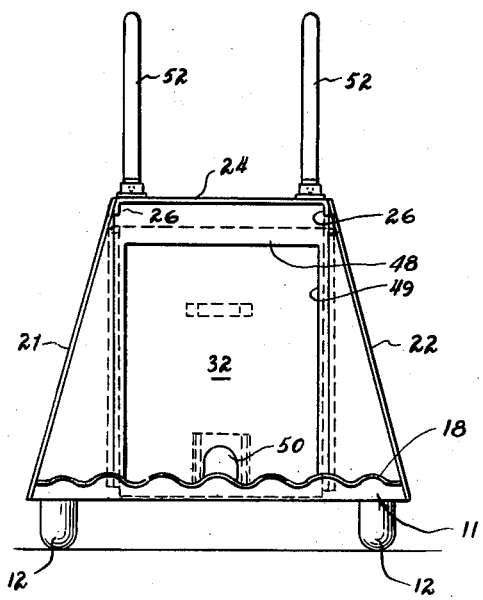
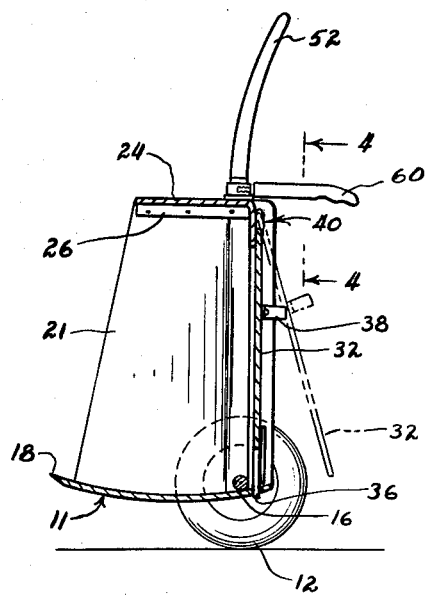
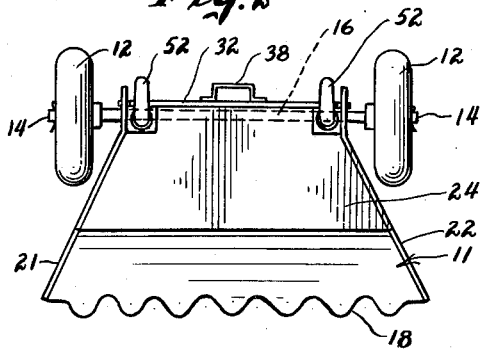
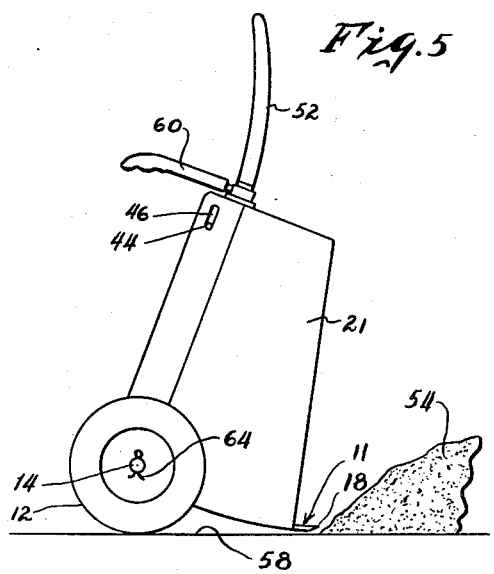
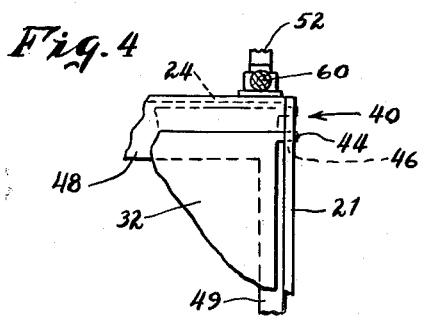
INVENTOR.
Henry Wynn Wright
BY Emery, Whittemore
Sandoe & Dix
ATTORNEYS

United States Patent Office 2,932,103
Patented Apr. 12, 1960

2,932,103

SHOVEL CART

Henry Wynn Wright, Towaco, N.J.

Application November 21, 1956, Serial No. 623,698

3 Claims. (Cl. 37—130)

This invention relates to apparatus for shovelling and transporting material. More particularly, the invention relates to a shovel cart having a bottom wall which serves as a shovel and having side walls which cooperate with the shovel to form a cart body for holding the shovelled material for transportation from place to place. The invention provides a convenient and efficient means for loading and transporting material manually, though for long hauls the shovel cart can be moved by a small tractor.

It is an object of the invention to provide an improved apparatus for transporting loads of material, such as commonly carried in wheelbarrows, but with the apparatus constructed in such a way that it also operates as a shovel for loading the material; and in the preferred construction a back wall of the device can be opened to discharge the material at the location to which it is transported.

Another object of the invention is to provide a time and labor saving device comprising in one self-contained unit, a shovel mounted on an axle, two wheels supporting the axle and walls extending upwardly from the shovel to provide a cart body for containing the material to be hauled; the back wall being hinged to swing into position for dumping the load at the end of the haul.

Another object of the invention is to provide an improved apparatus of the character indicated for doing shovelling and hauling where manual labor only is available, or where only manual labor can be used because the location may be such that heavy equipment can not be operated, due to insufficient support or nearness to structures or other objects which might be damaged, or where the area is restricted by buildings or scaffolding which preclude the introduction of power-operated loaders.

Another object of the invention is to provide a shovel cart having greater mechanical advantage for the operator in shovelling and loading material to be hauled. The invention is particularly useful for use with topsoil, sand, gravel, fill, road-surfacing material and snow. It can also be used to advantage with potatoes which are located in piles, and for other farm produce. Another use of the invention is in moving large and heavy stones which can be rolled on the shovel and then loaded into the cart by tilting the cart in a manner which will be more fully explained in describing the operation.

Other objects, features and advantages of the invention will appear or be pointed out as the description proceeds.

In the drawing, forming a part hereof, in which like reference characters indicate corresponding parts in all the views;

Figure 1 is a front view of a shovel cart made in accordance with this invention;

Figure 2 is a top view of the apparatus shown in Figure 1;

Figure 3 is a vertical sectional view of the shovel cart shown in Figure 1 with auxiliary handles connected to it for use when plowing snow, or for similar operations where the cart may be advanced for substantial distances without tilting;

Figure 4 is an enlarged, fragmentary rear view taken on the plane 4—4 of Figure 3; and Figure 5 is a side elevation of the shovel cart shown in Figure 3 with the cart in loading position.

The shovel cart includes a bottom or shovel 11 supported toward its rearward end by wheels 12. These wheels 12 have axles 14 extending from opposite sides of the shovel cart, and in the preferred construction the axles 14 are the opposite end portions of a continuous bar 16 that extends transversely of the shovel cart. The bar 16 is preferably secured to the shovel 11.

The shovel 11 is shown with a serrated and scalloped forward edge 18 for digging into piles of granular material, such as sand or gravel, but it will be understood that straight or convex forward edges can be provided for the shovel, as commonly used on conventional shovels and spades.

The shovel 11 is preferably constructed with a fore-and-aft curvature, as best shown in Figure 3. This curvature may be the surface of a cylinder having an axis of curvature extending transversely of the shovel cart parallel to the axle bar 16, and in the construction illustrated the shovel 11 has such a curvature. It will be understood, however, that the curvature need not be uniform and the axis of curvature may vary at different locations along the length of the shovel 11. If curved, in a fore-and-aft direction, the curvature may be described as being at least partially about a transverse axis parallel to the axle bar 16.

There are side walls 21 and 22 extending upwardly from the side edges of the shovel 11. The side edges of the shovel 11 converge toward the rear and the side walls 21 and 22 thus provide a flaring entrance for material into the shovel cart. The purpose of this flare is primarily to give the shovel 11 a width which is at least equal to and preferably slightly greater than the tread of the wheels 12. This permits the shovel cart to enter into any cut made by the shovel.

The side walls 21 and 22 may be of one-piece construction with the shovel 11 or may be of composite construction therewith, and connected to the shovel by welding or by any desired fastening means. There is a top wall 24 extending across the space between the side walls 21 and 22 and connected to the walls by downwardly bent angular ends 26 of the top wall 24. These angular end portions 26 may be spot welded or otherwise fastened to the side walls, and the top wall 24 may be of various constructions, its principal purpose being to brace the side walls 21 and 22 and hold them in the desired spaced relation at their upper ends.

The top wall 24 also serves the purpose of providing an end of a box-like body of the shovel cart in which material is carried; but in the use of the shovel cart it is rarely tilted enough to make the top wall 24 necessary for holding material in the cart. If the top wall is used only for its bracing function, it need not be of continuous extent along the entire length of the side walls 21 and 22.

The shovel cart has a back wall 32 for closing the space above the shovel 11 and between the rearward portions of the side walls 21 and 22. This back wall 32 is preferably hinged at least along a portion of its length and on a transverse axis so that the bottom of the back wall 32 can swing rearwardly, away from the rearward end of the shovel 11, as shown in dotted lines in Figure 3, for dumping material out of the shovel cart. In the construction illustrated, the entire back wall 32 swings rearwardly.

The back wall 32 is connected to the side walls 21 and 22 by a sliding hinge connection which permits the back wall to be raised and lowered. There is an abutment surface carried by the shovel 11 for preventing the back wall from swinging during the loading and hauling operations of the shovel cart. In the construction illustrated, this abutment is the rearward surface of a slot 36 in the shovel 11. The lower end of the back wall drops into this slot 36. When the care is to be dumped, the back wall 32 is lifted by a handle 38 extending rearwardly from the wall 32. This lifting of the back wall is sufficient to raise its lower edge clear of the slot 36, and this leaves the back wall 32 free to swing rearwardly into the dotted position shown in Figure 2. The hinge means by which the back wall 32 swings is indicated generally by the reference character 40.

Figure 4 shows the construction of the hinge means 40 at one side of the shovel cart. There are similar hinge means on the other side. At the upper end of the back wall 32, there are studs 44 extending outwardly from the back wall into a slot 46 in the side wall 21. This slot 46 is long enough to permit the vertical movement which is necessary to lift the rearward wall 32 clear of the slot 36 (Figure 3) or such other abutment as may be provided for holding the back wall against swinging movement during the loading and hauling operations. The back wall 32 overlaps angular elements 48 and 49 (Figure 4) which form part of the frame of the body portion of the cart, these angular elements 48 and 49 being secured to the top wall 24 and side wall 21, respectively.

At the upper end of the shovel cart there are handle means 52. These handle means extend upwardly from the body portion of the cart and are secured thereto at their lower ends.

The shovel cart has a stirrup 50 by which an operator can push the cart forward with one foot. In the illustrated construction, the stirrup 50 is an opening in the back wall 32; this opening being large enough to admit the front part of the operator's foot so that he can push against the rearward edge of the shovel 11, and against the axle bar 16. This provides a convenient and efficient way in which the shovel can be forced into a pile of material to be loaded.

If the shovel cart is to be used for material with which the opening 50 would be undesirable, then the stirrup may consist of any other abutment surface at the rear of the cart and near the lower end in position for convenient thrust by the operator's foot.

There are two features in connection with the handle means 52. One is that they have grip portions, at a convenient height for the operator, located forward of the axles 14, when the shovel cart is in loading position, as shown in Figure 5. This permits the operator to pull rearwardly on the handle means 52 while thrusting the lower part of the cart, including the shovel 11, forwardly to dig into a pile of material 54. This causes the shovel 11 to move into the pile 54 and at the same time to rock upwardly about the axles 54 so that the shovel moves with substantially the same motion as is imparted to an ordinary hand shovel. The shovel cart is tilted further to the rear so as to cause the material on the shovel 11 to slide down into the cart between the side walls 21 and 22, and then the cart is tilted forwardly to dig another scoop of material from the pile 54. The axles 14 and wheels 12 are located toward the rearward part of the shovel 11 so that the cart can be tilted into a position with the shovel extending upwardly to hold material in the cart while it is wheeled along the ground, indicated by the reference character 58, for deposit at a new location.

A second feature of the handle means 52 is that they are preferably spaced from one another so that the operator can grip the opposite sides with different hands to pull the handle means straight back, and the space between them, above the body of the cart, is unobstructed so that the handle means 52 can tilt rearwardly and into positions on both sides of the operator while he is thrusting the shovel forwardly with his foot.

For certain uses to which the invention can be put, for example snow removal, it is sometimes desirable to push the shovel 11 forwardly for substantial distances without raising it from the ground. When operated in this way, the shovel cart is more conveniently used by providing auxiliary handle means 60 which clamp to each of the handle means 52. These auxiliary handle means extend rearwardly at a different angle from the handle means 52 and provide convenient grips by which the operator can hold the shovel cart in the position illustrated in Figure 5 while advancing the shovel 11 along the ground for snow clearance, or other uses where substantial forward movement is desirable before tilting the cart.

The wheels 12 are held on the axles 14 by cotter pins 64. These cotter pins are merely representative of detachable fastening means for retaining the wheels on the axles. The wheels 12 can be conveniently removed and replaced with wheels of larger or smaller diameter when the shovel cart is to be used for purposes where larger or smaller angles of the shovel 11 are desirable for loading.

The preferred embodiment of the invention has been illustrated and described, but changes and modifications can be made and some features can be used in different combinations without departing from the invention as defined in the claims.

What is claimed is:

1. A shovel cart comprising a bottom wall which serves as a shovel, wheels supporting the bottom wall toward its rearward end and at a low elevation whereby the forward end of the shovel rests on the ground when the cart is in loading position, side walls and a back wall extending upwardly from the shovel and forming the body portion of the cart, handle means by which the cart is tilted rearwardly to drop material on the shovel against the back wall in the space between the side walls when shifting the cart from loading to traveling position whereby both the bottom and back walls are under the material while the cart is traveling, and hinge means connecting the back wall to the remainder of the cart, the hinge means being located at a substantial distance above the bottom wall and in position so that the lower end of the back wall swings into an open position clear of the rearward end of the bottom wall for dumping the contents of the cart, the bottom wall and back wall being shaped to meet with one another at a dihedral angle of substantial magnitude whereby material on the bottom wall slides off the bottom wall when the cart is tipped rearwardly with the back wall in open position.

2. The shovel cart described in claim 1 and in which the back wall is connected to the remainder of the cart by sliding hinge means movable toward and away from the bottom of the cart and pivoted for rotation about an axis extending transversely of the cart and substantially parallel to the axles, and an abutment surface carried by the bottom and in front of which the back wall engages when moved into closed position.

3. A shovel cart comprising a bottom wall which serves as a shovel, wheels on opposite sides of the cart and toward the rearward part of the shovel and supporting the rearward part of the shovel at a low elevation whereby the front of the shovel can contact with the ground when the cart is in loading position, sides extending upwardly from the shovel, the front edge of the shovel being substantially wider than the tread of the wheels, but the side walls and side edges of the bottom wall converging toward the rear of the cart and extending between the wheels, and a back wall also extending between the wheels and closing the space above the shovel and between the rearward ends of the side walls, and handle means connected to the cart and in position for tilting the cart rearwardly about the axes of the wheels as the lower part of the cart is pushed forwardly to dig the shovel into material to be loaded in the cart, the shovel being curved throughout its entire fore-and-aft length, and the curve extending immediately adjacent to the axis of the wheels whereby the shovel can penetrate into a mass of material and lengthwise along an arc as the cart tilts rearwardly about the axis of the wheels.

References Cited in the file of this patent

UNITED STATES PATENTS

| | | |
|---|---|---|
| 327,990 | Bartram | Oct. 13, 1885 |
| 861,308 | McMann | July 30, 1907 |
| 1,513,238 | Gross | Oct. 28, 1924 |
| 1,624,376 | Venable | Apr. 12, 1927 |
| 1,804,403 | Dowling | May 12, 1931 |
| 2,256,953 | Smith | Sept. 23, 1941 |
| 2,520,606 | McLoughlin | Aug. 29, 1950 |

FOREIGN PATENTS

| | | |
|---|---|---|
| 666,905 | Great Britain | Feb. 20, 1952 |